United States Patent
Binning

(10) Patent No.: US 7,245,704 B2
(45) Date of Patent: Jul. 17, 2007

(54) AUTOMATED THIRD PARTY CALL ACTIVATED WHEN 911 DIALED

(75) Inventor: Valerie Binning, Cumming, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 169 days.

(21) Appl. No.: 10/768,801

(22) Filed: Jan. 30, 2004

(65) Prior Publication Data

US 2005/0169439 A1 Aug. 4, 2005

(51) Int. Cl.
H04M 11/00 (2006.01)

(52) U.S. Cl. ........................................ 379/45

(58) Field of Classification Search ............ 379/37–51, 379/142.01, 221.08, 201.02, 202.01, 203.01, 379/204.01, 205.01, 207.02; 455/404.1, 455/404.2; 348/14.01–14.16
See application file for complete search history.

(56) References Cited

U.S. PATENT DOCUMENTS

| | | | |
|---|---|---|---|
| 4,935,951 A | 6/1990 | Robinson et al. | |
| 4,993,058 A | 2/1991 | McMinn et al. | |
| 5,012,507 A | 4/1991 | Leighton et al. | |
| 5,161,180 A | 11/1992 | Chavous | |
| RE34,677 E | 7/1994 | Ray et al. | |
| 5,621,379 A | 4/1997 | Collins | |
| 5,673,304 A | 9/1997 | Connor et al. | |
| 5,940,474 A * | 8/1999 | Ruus | 379/49 |
| 6,009,148 A | 12/1999 | Reeves | |
| 6,307,920 B1 | 10/2001 | Thomson et al. | |
| 6,476,763 B2 | 11/2002 | Allen, Jr. | |
| 6,608,886 B1 * | 8/2003 | Contractor | 379/45 |
| 6,624,754 B1 | 9/2003 | Hoffman et al. | |
| 6,680,998 B1 | 1/2004 | Bell et al. | |
| 6,703,930 B2 * | 3/2004 | Skinner | 379/38 |
| 6,792,081 B1 | 9/2004 | Contractor | |

* cited by examiner

*Primary Examiner*—Stella Woo
(74) *Attorney, Agent, or Firm*—Bambi Falvre Walters; Walters & Zimmerman, PLLC

(57) ABSTRACT

Methods, systems, and apparatuses that operate with different communications devices, different users, and/or different communications networks to generate, enable, disable, transmit, and/or otherwise control an Emergency Third Party Communications Signal. According to embodiments of this invention, a communications network establishes an emergency communications link between a calling party and an emergency response call center. Thereafter, the communications network automatically associates a third party to add to the emergency communications link and uses the Emergency Third Party Communications Signal to establish an emergency conferencing communications link between the third party, the calling party, and/or the emergency response call center.

13 Claims, 7 Drawing Sheets

AUTOMATED THIRD PARTY CALL ACTIVATED WHEN 911 DIALED

BACKGROUND OF THE INVENTION

1. Field of the Invention

This invention relates generally to the field of telecommunications. More particularly, this invention relates to systems and methods for a telecommunications network to automatically add in a third party to a communications link between a calling party and emergency response personnel.

2. Description of the Related Art

In emergency situations, timely assistance provided by emergency service personnel is often critical to minimize injuries, save lives, and/or minimize property damage. Often times, a mere delay of a few minutes, or even a matter of seconds, may have severe consequences in saving the life of an individual, such as an individual having a heart attack or an individual suffering from severe blood loss. Likewise, delays in reaching the scene of a fire or other catastrophic event may have catastrophic consequences to property damage. Thus, the time it takes for emergency personnel, such as, police, fire, and medical personnel, to reach the location to respond to the emergency makes a difference.

In an effort to increase the response speed of emergency response personnel, centralized emergency response telephone services, such as, for example, 911 and enhanced 911, have been implemented so that dispatch personnel at the answer center are provided with detailed information (e.g., an address of a home associated with the calling phone number, special needs of individuals at the calling phone number, a database of other 911 calls from that phone number and how they were responded to in the past, and so on) and provided with access to a wide variety of emergency response personnel to implement appropriate assistance necessary to respond to the emergency. For example, if a 911 caller reported a fire in a home from the calling phone number, then the dispatch personnel notify the fire department closest to the home to control the fire, and if appropriate, also notify nearby medical personnel to treat any victims of the fire and/or notify nearby law enforcement to control potentially hazardous situations, such as hysteria of the residents and/or crowds.

Unfortunately, a delay in reaching the location of the emergency may occur when the location of the calling phone number is different than the location of the emergency. For example, if a user of a cellular phone places the call to 911, then the address of the home with the emergency may not be provided to the dispatch personnel, especially if the caller is emotionally or physically distraught and unable to communicate the address. Still another example is when a call to the dispatch center is called from a calling phone associated with a different street address, such as a call from a neighbor's house to report a fire. In such a case, the detailed information that accompanies the incoming call to the dispatch center does not provide an accurate street address, rather the street address of the fire (i.e., the actual location of the emergency) must be provided by the calling party and/or approximated by the dispatch center. Because this address is often imprecise, the responding emergency personnel may be delayed trying to locate an approximated street address of the emergency, such as trying to look for a signs of an emergency in an area proximate to the approximated street address, going to the address of the third party caller to seek assistance in locating the emergency, and trial and error of knocking on doors until the precise street address and location are determined.

Even when a street address of the location of the emergency is known, the emergency personnel may still experience delays in locating the emergency premises. For example, when the responding emergency response personnel near the street address at which the request for emergency response assistance originated (e.g., the home), the personnel is often unfamiliar with the exact street address and is forced to proceed at a slower pace in order to precisely locate the street address. Further, the task of locating the exact street address can be more difficult when visibility conditions are poor, such as at night, when there is precipitation, and/or when there is smoke or other environmental and/or wildlife conditions that inhibit visibility. This task may be even more difficult when the home of the originating call is located in an area where the homes are far apart, road signs are difficult to find and/or read, and/or addresses are not easily visible on the exterior of the home or other outbuilding of the home (e.g., a mailbox).

Even after the emergency response personnel have reached the emergency location, additional problems and/or complications arise when the emergency response personnel have little information to respond to the emergency. For example, if the caller to the emergency response call center (or another individual at the emergency site) has limited communication capabilities, then the emergency response personnel have little information about the emergency and/or little information about the individuals or the property involved in the emergency. In such cases, the emergency response personnel frequently make assumptions and/or initiate standard procedures that have unfortunate or complicating consequences. For example, if the emergency response personnel respond to a call for medical help and arrive at the location with an unconscious individual, then the emergency response personnel are not aware of the individual's medical conditions, such as allergies and current medications. In such cases, the emergency response personnel may administer medications that the individual is allergic to and/or that have threatening synergistic effects with other medications that the individual is taking.

Accordingly, what is needed are systems, methods, and apparatus that provide an emergency locating and communications system to overcome and/or improve the above and other problems to minimize the amount of time it takes for emergency response personnel to reach the street address and/or precise location of an emergency and to maximize communication of helpful information to better respond to the emergency. In addition, what is needed are emergency locating and communications systems, methods, and apparatus that are easy to install, manage, and/or use.

BRIEF SUMMARY OF THE INVENTION

This invention addresses the above and other needs by providing systems, methods, and apparatus to automatically add a third party to an emergency communications link (e.g., a 911 call) between a calling party and an emergency response center. Typically, a calling party uses a communications device to establish an emergency communications link and to communicate an emergency message over a communications network to an emergency response call center (e.g., a 911 call for help). The communications network detects, decodes, and connects the communications signal to the emergency response center. At the same time, or nearly the same time, the communications network associates the communications signal with an Emergency Third Party Communications Profile that includes an Emergency Third Party Communications Address and information about adding in the third party (or teleconferencing) to the emergency communications link. The communications network may use the Emergency Third Party Communications Profile to contact the third party, present a notification of the emergency communications link between the calling party and the emergency response center, present a notification to the calling party and/or the emergency response center to announce that the third party will join the emergency communications link, and add in the third party so that an emergency conference communications link is established between the calling party, the emergency response center, and the third party.

According to embodiments of this invention, an emergency communications system includes a communications network and an Emergency Third Party Communications Application. The communications network detects, decodes, and communicates a communications signal to an emergency response communications address, such as, for example, a centralized emergency response call center (e.g., 911), a police station, a fire station, a poison control center, an ambulance service, and/or the like. The communications network includes an Emergency Third Party Communications DataServer that stores and processes an Emergency Third Party Communications Profile. When the communications signal is decoded by the communications network, the Emergency Third Party Communications Application associates the profile. Thereafter, the Emergency Third Party Communications Application uses the profile to initiate communications with an Emergency Third Party Communications Address. The communications network establishes an emergency conference communications link with the emergency third party communications address. According to embodiments, the communications network may provide a notification message to a third party's communications device associated with the third party communications address. For example, the third party's communications device may present an audio message that states "There is an emergency call between 9-1-1 and 336-784-4000. You may join the emergency call by pressing or saying 1." Alternative examples may include presenting the name of an individual associated with the originating communications address, that is, the calling party's communications address and automatically adding the third party (without prompting for a confirmation to join the emergency call). According to further embodiments, this invention enables the calling party to automatically establish a communications link with the third party after the emergency call ends. The communications network may include a public switched telephone network, a mobile switching telephone communications network, and a satellite communications network. Still further, the communications network may include a world wide electronic data communications network that enables an emergency Third Party Communications user interface via an internet, an intranet, and/or an extranet.

According to other embodiments of this invention, a communications method includes (1) processing an incoming communications signal from a calling party's communications device to an emergency response communications address to establish an emergency communications link, (2) associating an incoming line identification (ICLID) signal and/or an enhanced emergency response identification signal with the incoming communications signal, (3) associating an Emergency Third Party Communications Profile with the ICLID signal or other associated information, (4) transmitting an Emergency Third Party Communications Signal to an Emergency Third Party Communications Address, (5) presenting a notification message of emergency communications link to a third party's communications device of the Emergency Third Party Communications Address, and (6) using an emergency conferencing link to connect the third party's communications device with the emergency communications link. According to an embodiment, the Emergency Third Party Communications Signal includes the Emergency Third Party Communications Address, the notification message, and the emergency conferencing link. In further embodiments, the method includes receiving a selection from the third party to control the emergency conferencing link and, thereafter, using the incoming communications signal, the Emergency Third Party Communications Profile, and/or the selection from the third party to control the emergency conferencing link. In still further embodiments, the method includes presenting a notification message to establish the emergency conferencing link to the calling party and/or to the emergency response call center and/or prompting the calling party and/or the emergency response call center for authorization to establish the emergency conferencing link.

According to further embodiments of this invention, another communications method includes (1) receiving a communications signal from a calling party's communications device to an emergency response communications address, and (2) using the communications signal to generate an Emergency Third Party Communications Signal. The Emergency Third Party Communications Signal includes an Emergency Third Party Communications Address, a third party's communications device associated with the Emergency Third Party Communications Address, an identifier of a third party, a notification message for alerting a third party of an available emergency conferencing link for joining an emergency communications link between a calling party and an emergency response call center, a notification message for alerting the calling party and/or the emergency response call center that the third party is available to join the emergency communications link, an originating communications address associated with a calling party's communications device, the Emergency Response Communications Address, a communications parameter, and/or a third party control parameter. The communications network may include a public switched telephone network and/or a mobile switching telephone communications network.

According to still other embodiments of this invention, a computer program product includes a computer-readable medium and an Emergency Third Party Communications Module stored on the computer-readable medium. The Emergency Third Party Communications Module is stored in a memory device. Further, the Emergency Third Party Communications Module uses an Emergency Third Party Communications Profile and/or an instruction from a calling party's communications device to initiate communications with an Emergency Third Party Communications Address.

Further details on these embodiments and other possible embodiments of this invention are set forth below. As is appreciated by those of ordinary skill in the art, this invention has wide utility in a number of areas as illustrated by the discussion below. These embodiments may be accomplished singularly, or in combination, in one or more of the implementations of this invention.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
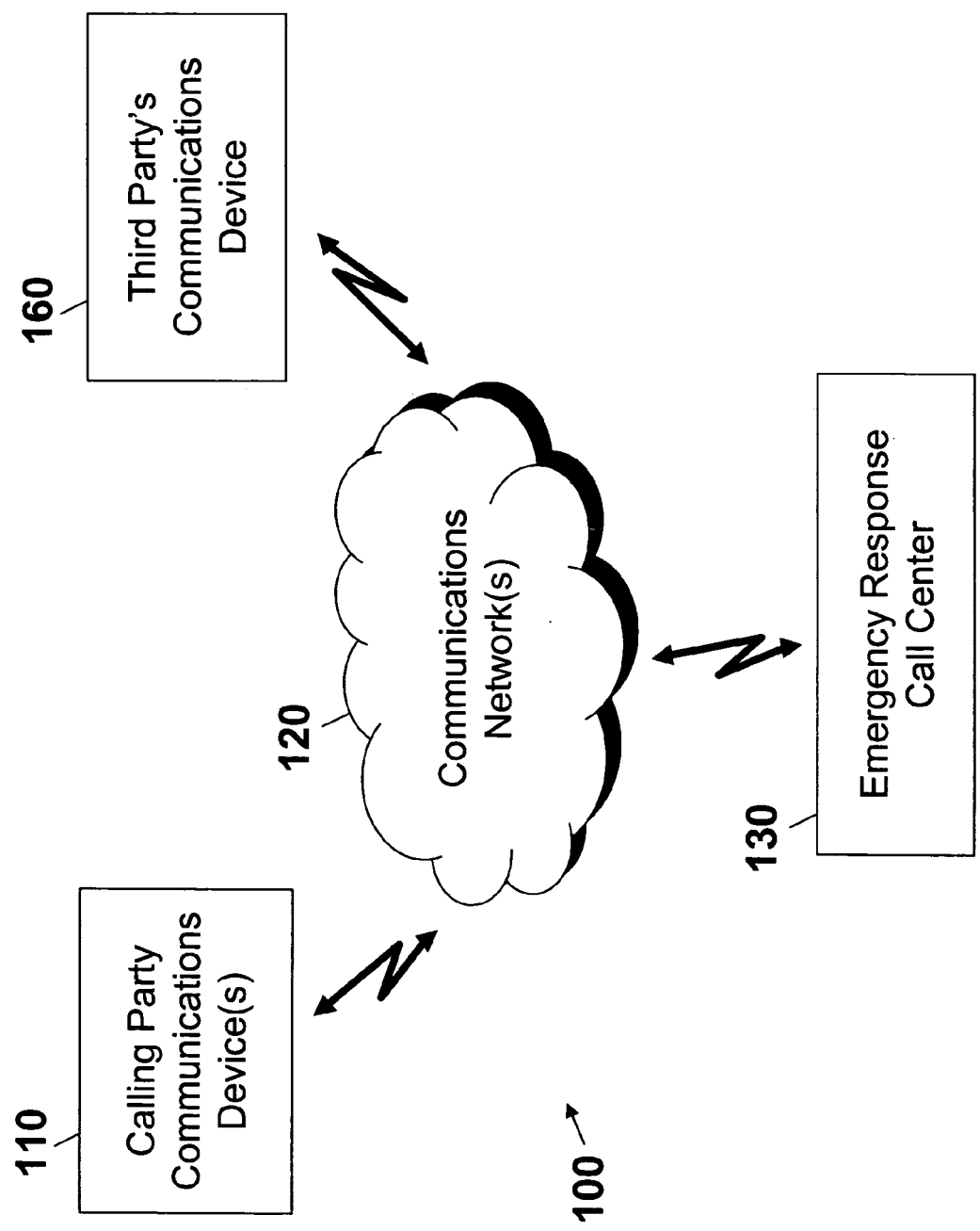
FIG. 1 is a schematic of a communications system illustrating a communications network connecting a calling party's communications device coupled with an emergency alert to an emergency response call center according to embodiments of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

As used herein, the term "communications device" includes wired and wireless communications devices, such as a POTS phone, a mobile phone, a wireless phone, a WAP phone, a satellite phone, a computer, a modem, a pager, a digital music device, a digital recording device, a personal digital assistant, an interactive television, a digital signal processor, and a Global Positioning System device. Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with a receiving party, and/or (4) one or more Emergency Third Party Communications Profiles associated with the Emergency Third Party Communications Signal. In various embodiments, the data may be stored by one or more communications network, a peripheral storage device connected to the communications network, other connected networks, and/or one or more communications devices.

The systems and methods of this invention operate with different communications devices, different users, and different communications networks to generate, enable, and/or transmit an Emergency Third Party Communications Signal via the communications network to an Emergency Third Party Communications Address. Typically, a calling party uses a communications device to communicate an emergency message (also referred to herein as "an incoming communications signal" and as "a communications signal") over a communications network to an emergency response call center (e.g., a 911 call for help to a centralized emergency response dispatch center). The communications network detects, decodes, and connects the communications signal to the emergency response call center. At the same time, or nearly the same time, the detected communications address of the emergency response center triggers the communications network to associate the incoming communications signal with an Emergency Third Party Communications Profile that includes an Emergency Third Party Communications Address and information about joining and/or controlling communications with a third party to the communications link of the calling party and the emergency response call center. An Emergency Third Party Communications Application uses the profile to generate and/or communicate an Emergency Third Party Communications Signal over the communications network to the Emergency Third Party Communications Address. The Emergency Third Party Communications Signal enables an emergency conferencing communications link between the calling party, the emergency response call center, and the third party. For example, the calling party may be a child located in a home. When the child places a 911 call, the communications network detects and decodes the communications signal to associate the Emergency Third Party Profile with a communications address for a parent, such as a mother's cellular phone number. The Emergency Third Party Application then initiates communications with the mother's cell phone to add in the mother to the connected 911 call. Such a communications connection is useful for (1) immediately alerting the mother of the 911 call and (2) immediate availability of the parent to provide essential and/or supplemental information, such as special needs of the child, current medications, a location of a spare key to the house, name of a medical care provider, information about other occupants in the home, and other information.

Referring now to the figures, FIG. 1 illustrates a communications system 100 including a calling party's communications device 110, a communications network 120, an emergency response call center 130, and a third party's communications device. Typically, the calling party (e.g., a customer and/or a user) subscribes to a network-enabled Emergency Third Party Communications Service. When the calling party uses his/her communications device 110 to communicate an emergency message (also referred to herein as "an incoming communications signal") over the communications network 120 to the emergency response call center 130 (e.g., a 911 call for help to a centralized emergency response dispatch center), the communications 120 network detects, decodes, and connects the incoming communications signal to the emergency response call center 130. At the same time, or nearly the same time, the detected communications address (e.g., 911, a phone number and/or an IP address associated with the emergency response call center 130, and other communications address of emergency response providers) of the emergency response call center 130 triggers the communications network 120 to associate the incoming communications signal with an Emergency Third Party Communications Profile that includes an Emergency Third Party Communications Address and information about establishing a connection with a third party. An Emergency Third Party Communications Application uses the Emergency Third Party Communications Profile to generate and/or communicate an Emergency Third Party Communications Signal over the communications network 120 to the third party's communications device 160 coupled with the Emergency Third Party Communications Address. The Emergency Third Party Communications Signal may activate, deactivate, and/or monitor the emergency third party's communications device 160. When the Emergency Third Party Communications Signal is transmitted, it enables an emergency third party communications conferencing link between the calling party, the emergency response call center, and the third party. Typically, the third party's communications device 160 has a different communication address than the calling party's communications device 110. That is, the Emergency Third Party Communications Address is different from the communications address of the calling party's communications device 110. Consequently, the calling party may use his/her communications device 110 anywhere (e.g., at the site of the emergency or at a remote site) to call the emergency response call center 130 and initiate network-based control of the emergency remote control system 150 and the third party may also use his/her communications device 160 anywhere to receive the Emergency Third Party Communications Signal.

Figure 2:
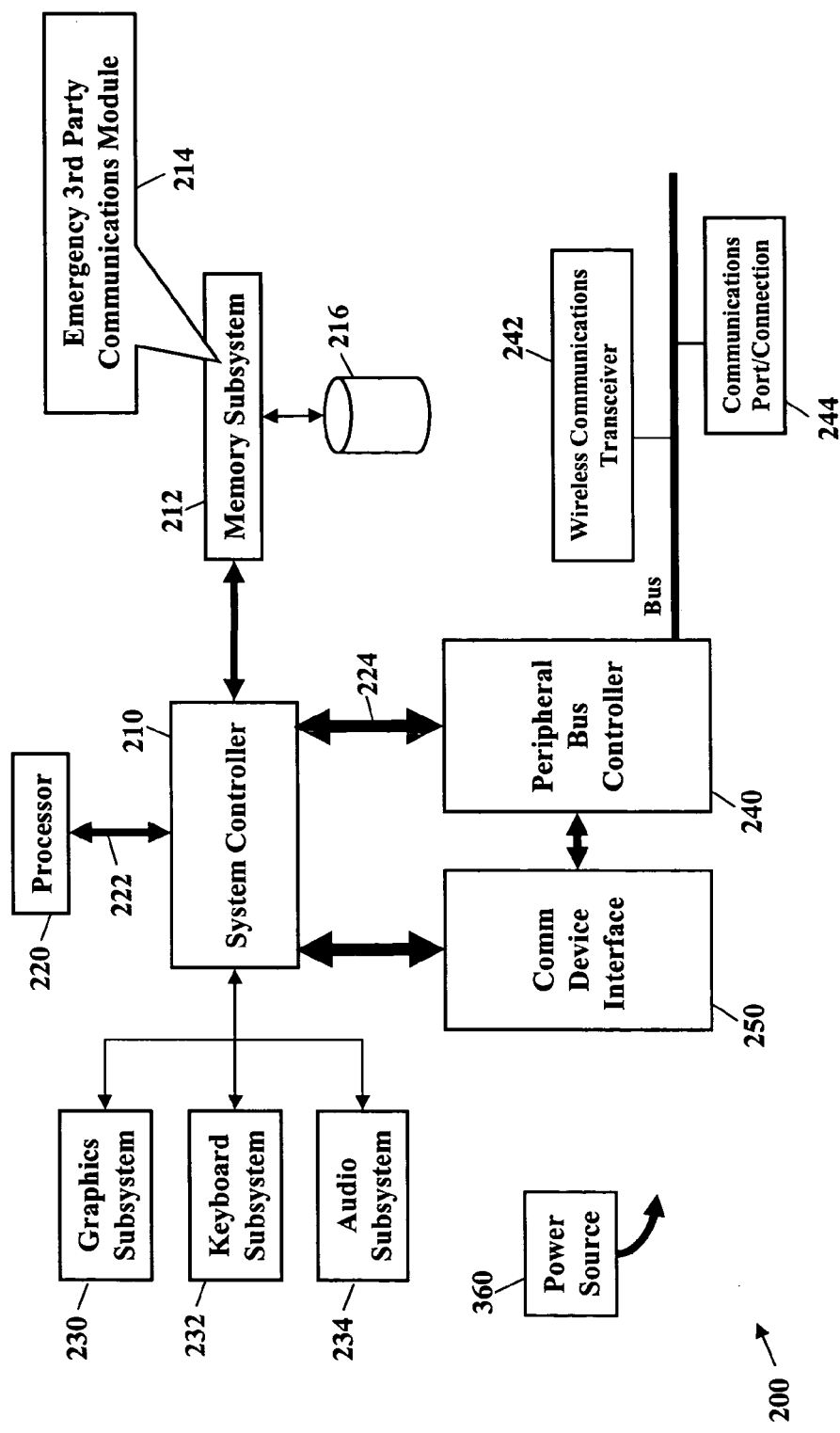
FIG. 2 is a schematic of another communications system illustrating a communications network connecting a calling party's communications device, an emergency response call center, an emergency alert, and an emergency remote control system according to embodiments of this invention.

FIG. 2 is a block diagram showing an Emergency Third Party Communications Module 214 that operates within a system memory device 212 of a computer 200. The Emergency Third Party Communications Module 214, however, could also reside in flash memory, a peripheral storage device 216, and/or a communications device (such as, for example, the calling party's communications device 110 of FIG. 1). The computer 200 also has one or more central processors 220 executing an operating system. The operating system, as is well known, has a set of instructions that control the internal functions of the computer 200. A system bus 222 communicates signals, such as data signals, control signals, and address signals, between the central processor(s) 220 and a system controller 210. The system controller 210 provides a bridging function between the memory subsystem 212, the one or more central processors 220, a graphics subsystem 230, a keyboard subsystem 232, an audio subsystem 234, a PCI (Peripheral Controller Interface) bus 224, and a Communications ("Comm") Device Interface 250. The PCI bus 224 is controlled by a Peripheral Bus Controller 240. The Peripheral Bus Controller 240 is an integrated circuit that serves as an input/output hub for various peripheral ports and/or transceivers. These peripheral ports allow the computer 200 to communicate with a variety of communications devices through networking ports (such as SCSI or Ethernet) that include Wireless Communications ("Comm") Device Transceiver 242 (such as Wireless 802.11 and Infrared) and Wired Communications ("Comm") Device Port/Connection 244 (such as modem V90+ and compact flash slots). These peripheral ports could also include other networking ports, such as, a serial port (not shown) and/or a parallel port (not shown). The Comm Device Interface 250 allows the computer 200 to monitor, detect, receive, and decode incoming communications signals to the communications device(s) connected to the Wireless Comm Device Transceiver 242 and/or the Wired Comm Device Port/Connection 244. Further, the Comm Device Interface 250 may communicate the Emergency Third Party Communications Signal to the Wireless Comm Device Transceiver 242 and/or the Wired Comm Device Port/Connection 244 which may thereafter communicate the Emergency Third Party Communications Signal via the communications network 120 to the third party's communications device 160. According to alternate embodiments, the Wireless Comm Device Transceiver 242 and/or the Wired Comm Device Port/Connection 244 may communicate the Emergency Third Party Communications Signal directly to the third party's communications device. In addition, the computer 200 may include a power source 260, such as a rechargeable battery to provide power and allow the computer 200 to be portable. In alternate embodiments, the computer 200 could include its own telephone line (or other communications connection and/or communications address) to the communications network 120 (not shown). Another alternative may include the computer 200 incorporated into a component of the communications network 120 (such as integrated componentry with an Emergency Third Party Communications DataServer 339 of FIG. 3) or a specially designed communications device (not shown).

Those of ordinary skill in the art also understand the central processor 220 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 212 or peripheral storage device 216) may also contain one or more application programs. For example, an application program may cooperate with the operating system and with a video display unit (via graphics subsystem 230) to provide a GUI for the Emergency Third Party Communications Module 214. The GUI typically includes a combination of signals communicating with the graphics subsystem 230 and/or the keyboard subsystem 232. The GUI provides a convenient visual and/or audible interface with the user of the computer 200. As is apparent to those of ordinary skill in the art, the user (e.g., receiving party, calling party, and/or administrator) interacts with the Emergency Third Party Communications Module 214 over a variety of mediums, such as, for example, a stylus, keyboard, and punch buttons of the keyboard subsystem 232, a display screen of the graphics subsystem 230, and/or a voice-activated menu prompt of the audio subsystem 234.

Figure 3:
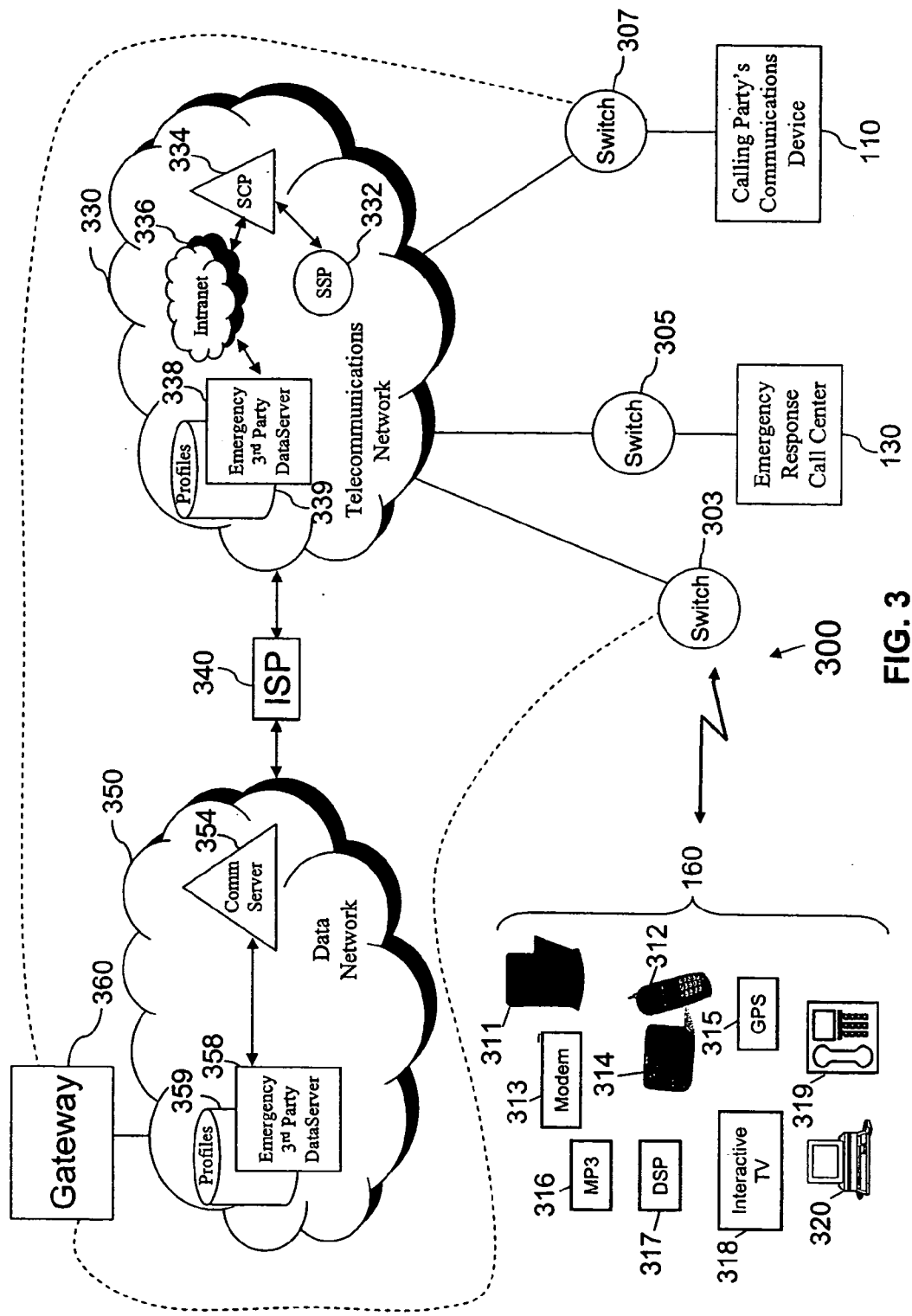
FIG. 3 is a block diagram of an Emergency Third Party Communications Module residing in a computer system according to embodiments of this invention.
Figure 4:
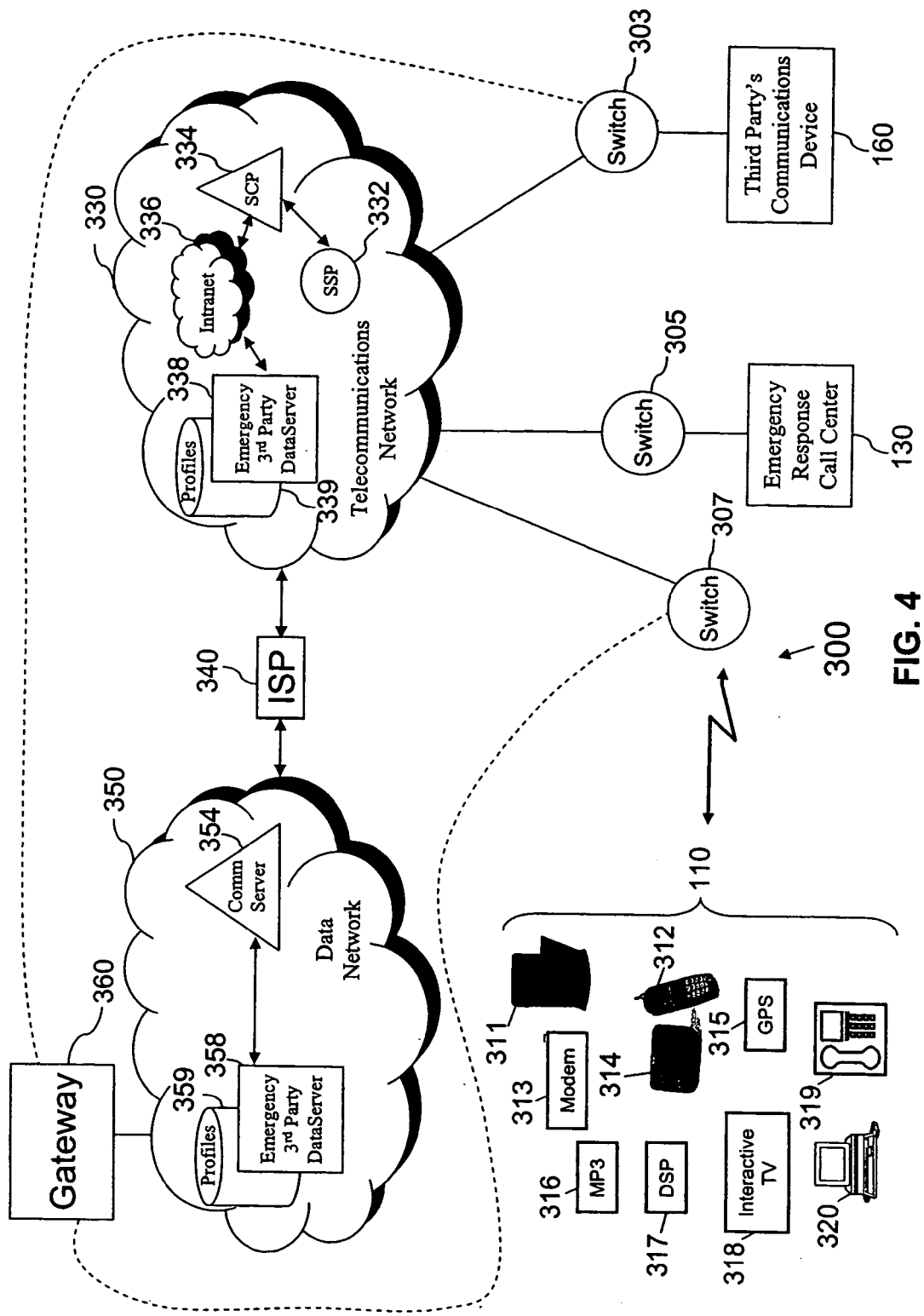
FIG. 4 is another schematic of a communications system illustrating different communications networks, different users, and different communications devices communicating with the emergency remote control system according to embodiments of this invention.

FIG. 3 is a schematic of a communications system 300 illustrating communications connections of different communications networks and different communications devices that operate to activate, deactivate, and/or otherwise control the emergency third party communications signal. As shown in FIG. 3, the third party's communications device 160 may be a variety of communications devices including a Personal Digital Assistant (PDA) 311, an IP phone 312, a modem 313, an interactive pager 314, a global positioning system (GPS) 315, an MP3 player 316, a digital signal processor (DSP) 317, and an interactive television 318, a POTS phone 319, and a personal computer 320. Communications system 300 includes these communications devices 311–320, switches 303, 305, 307, emergency response call center 130, the calling party's communications device 110, a telecommunications network 330 having a Service Switching Point (SSP) 332, a Service Control Point (SCP) 334, an Intranet (for the telecommunications provider to administer and program the telecommunications network 330 components and/or for the subscriber/user to access, program, and/or otherwise manage a Emergency Third Party Communications Profile), an Emergency Third Party Communications DataServer 338, and a database of Emergency Third Party Communications Profiles 339, an Internet Service Provider (ISP) 340 (e.g., America On-Line), a data network 350 having a communications server 354, an Emergency Third Party Communications DataServer 358, and a database of Emergency Third Party Communications Profiles 359, and a gateway 360. FIG. 4 illustrates a communications system 400 similar to the communications system 300 of FIG. 3; however, a variety of communications devices are illustrated to show exemplary calling party's communications devices 110 including a Personal Digital Assistant (PDA) 311, an IP phone 312, a modem 313, an interactive pager 314, a global positioning system (GPS) 315, an MP3 player 316, a digital signal processor (DSP) 317, and an interactive television 318, a POTS phone 319, and a personal computer 320. As shown in FIGS. 3 and 4, the third party communications device 160 communicates via switch 303 to the telecommunications network and to a gateway 360 communicating with data network 350. Switch 305 couples the telecommunications network 330 with the emergency response call center 130. Regardless of the third party's communications device 160 that receives the emergency third party communications signal, the data network 350 and/or the telecommunications network 330 is able to communicate (including audio, text (e.g., ASCII), video, other digital formats, and combination thereof) with the third party's communications device 160 to receive the signal and to establish an emergency conferencing link between the third party's communications device 160, the emergency response call center 130, and the calling party's communications device 110. Accordingly, the Emergency Third Party Communications DataServers 338, 358 and/or the gateway 360 of the data network 350 has the intelligence for appropriate formatting of communication signals to/from the connected communications device. For example, if the third party's communications device uses the Wireless Application Protocol (WAP) technique, then the emergency third party communications signal is formatted using the Wireless Mark-up Language (WML) and configured according to standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means. Alternatively, the communications signals may be formatted and/or otherwise configured for presentation by an application and/or componentry of the third party's communications device 160. Similarly, the communications signals to the calling party's communications device 110 may be appropriately formatted and/or otherwise configured for presentation.

The telecommunications network 330 may alternatively transmit the Emergency Third Party Communications Signal via ISP 340 (or other connection) of the data network 350. The data network 350 communicates the Emergency Third Party Communications Signal via the gateway 360 to the third party's communications device 311–320 via switch 303 and/or communicates a communications signal for the emergency conferencing communications link to the calling party's communications device 110 via switch 307 and/or to the emergency response call center 130 via switch 305. Similarly, the calling party's communications device 110 may generate and/or otherwise establish the Emergency Third Party Communications Signal and communicate the Emergency Third Party Communications Signal via the gateway 360 to data network 350 and/or to telecommunications network 330. Another embodiment discloses the telecommunications network 330 communicating the Emergency Third Party Communications Signal directly to the gateway 360 (such as when a Emergency Third Party Communications Profile associates a static IP address of the third party's communications device 160) to communicate with the switch 303 coupled with third party's communications device 160. In addition to transmitting the Emergency Third Party Communications Signal, the telecommunications network 330 may also connect the calling party's communications device 110 (or, alternatively the emergency response call center 130) with a third party's communications device 160 immediately after the emergency communications link between the calling party's communications device 110 and the emergency response call center 120 is terminated. That is, for example, the Emergency Third Party Communications Profile may provide that the Emergency Third Party Communications Signal establish an immediate communications connection with the third party's communications device 160 and with either the calling party's communications device 110 or the emergency response call center 130 after the emergency communications link is terminated. This may be desired when the calling party does not want the third party to participate in the emergency communications link, but wants the third party to be notified when an emergency call is placed from the calling party's communications device 110 or wants to establish a communications connection with the third party after the emergency call (for example, calling a neighbor, a doctor, a relative, and/or another individual after an emergency call to 911). Similarly, the Emergency Third Party Communications Profile may provide that the Emergency Third Party Communications Signal establish an immediate communications connection with the emergency response call center and with the third party's communications device. In such a case, a notification message may be presented first to the third party's communications device 160 to alert the third party that an emergency call was placed from a particular phone number (or alternate communications address associated with the calling party's communications device 110) and that a communications connection is now being established with the emergency response call center 130. Such a communication may be beneficial when the third party can provide additional information to the emergency response call center 130 without having the calling party participate. This may be helpful when the calling party is an elderly parent and the third party is his/her child.

The communications switches (e.g., 303, 305, and 307) allows the connected communications devices to transceive electronic communication signals via the telecommunications network 330 (e.g., a central office (CO), a mobile telephone switching office (MTSO), and/or a combination CO/MTSO) and/or the data network 350 via gateway 360. The telecommunications network 330 may use any means of coupling the switches to the telecommunications network 330, but the coupling means is preferably high-capacity, high-bandwidth optical transport services, Gigabit Ethernet services, and/or the like. As those of ordinary skill in the art of telecommunications understand, the telecommunications network 330 could also link the switches via other appropriate means, such as, for example a Synchronous Optical Network (SONET) structure with redundant, multiple rings.

The telecommunications network 330 may include wired, optical, and/or wireless elements and may further include private network elements, such as private branch exchanges (PBXs), and/or other elements (not shown). The telecommunications network 330 includes Advanced Intelligent Network (AIN) componentry controlling many features of the network. The telecommunications network 330 and/or each of the switches could also include a packet-based "soft switch" that uses software control to provide voice, video, and/or data services by dynamically changing its connection data rates and protocols types. If the telecommunications network 330 and/or one of the switches should include a softswitch, the AIN componentry is replaced by an application server that interfaces with the softswitch via a packet protocol, such as Session Initiation Protocol (SIP). The means of communicating between or among the calling party's communications device 110, the emergency response call center 130, the third party's communications device 160, the switches 303, 305, 307, the telecommunications network 330 including AIN componentry, and/or the data network 350 including the gateway 360 include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 802 standards, and Digital Subscriber Lines (DSL) are just some examples of the transmission means. The signaling between these devices and/or networks, however, is well understood in by those of ordinary skill the art and will not be further described. Further, those of ordinary skill in the art will be able to apply the principles of this invention to their own network configurations which may differ substantially from the communications system(s) shown in the figures.

According to embodiments of this invention, the telecommunications network 330 (or, alternatively, the data network 350) detects and decodes an incoming line identification signal (ICLID) of an incoming communications signal (or alternate network identification signal) to the emergency response call center 130 and connects the call. The incoming communications signal may originate from any of the exemplary calling party's communications devices 110 (e.g., reference numerals 411–420) in any of the communications networks (e.g., reference numerals 330 and 350). In an embodiment, the telecommunications network 330 compares the incoming communications signal with an Emergency Third Party Communications Profile stored in one or more databases 339, 359 to determine an Emergency Third Party Communications Address and information about controlling an Emergency Third Party Communications Signal. The incoming communications signal arrives at SSP 332 that analyzes the signal(s) and routes the incoming communications signal to the SCP 334. If the SCP 334 detects a communications address of the incoming communications signal (e.g., the phone number of the calling party's communications device 110) and a communications address of the emergency response call center 130, then the SCP 334 attempts to match the communications address of the incoming communications signal with the Emergency Third Party Communications Profile. That is, the SCP 334 may communicate with the Intranet 336 to or directly with the Emergency Third Party Communications DataServer 338 to accesses the database 339 of Emergency Third Party Communications Profiles to determine Emergency Third Party Communications Services associated with the communications address of the incoming communications signal. The matched Emergency Third Party Communications Profile contains parameters that establish the available Emergency Third Party Communications Services for the associated communications address. Thereafter, an Emergency Third Party Communications Application uses the Emergency Third Party Communications Profile to generate the Emergency Third Party Communications Signal, and the telecommunications network 330 (or alternatively the data network 350) transmits the Emergency Third Party Communications Signal to the Emergency Third Party Communications Address to establish an emergency conferencing communications link with the third party's communications device 160, the calling party's communications device, and/or the emergency response call center 130.

To create, modify, and/or access an Emergency Third Party Communications Profile, any of the calling party's communications devices 110 accesses a locally stored and/or remotely stored Emergency Third Party Communications Module 214 that interfaces with one or more of the communications networks (e.g., reference numerals 330, 350 and others communications networks described herein). For example, the telecommunications network 330 may present an interactive interface to the user of the calling party's communications device 110 that may be programmed over a variety of mediums, such as, for example, a voice-activated and/or Dual Tone Multi-Frequency (DTMF) menu prompt. The user, for example, might select to access stored Emergency Third Party Communications Profiles by entering a "1" on a touch-tone keypad or by speaking into a receiving audio subsystem and stating the word "one." After making a selection, the telecommunications network 330 retrieves the stored Emergency Third Party Communications Profile from a database and presents it to the user for additional instructions. Similarly, the user might select "2" to create and/or otherwise establish a new Emergency Third Party Communications Profile. In addition, the user might enter a code (e.g., "*99") in order to automatically block any communication of Emergency Third Party Communications Signals to a selected communications address. According to other embodiment, the user may alternatively contact (e.g., via a voice communication, via a web-based interface, and the like) a telecommunications service provider (or alternate communications provider) to have an administrator, other personnel, and/or componentry of the telecommunications service provider establish the Emergency Third Party Communications Profile. For example, the user may use the computer 420 and the Emergency Third Party Communications Module 214 to establish an Emergency Third Party Communications Profile that is communicated to telecommunications network 330. Alternatively, the user could use computer 420 and a web-based interface of the Data Network 350 to establish the Emergency Third Party Communications Profile. Regardless of how the Emergency Third Party Communications Profile is established, the Emergency Third Party Communications Profile is used to generate and/or otherwise manage the Emergency Third Party Communications Signal that is communicated to the third party's communications device 160.

According to embodiments of this invention, the database 339 (or alternatively 359) of Emergency Third Party Communications Profiles and the Emergency Third Party Communications DataServer 338 (or alternatively 358) control access, creation, notification, routing, security, transactions, troubleshooting, management, sharing, and/or additional processing of Emergency Third Party Profiles used to generate the Emergency Third Party Communications Signal that is exchanged to/from the telecommunications network 330 (or alternatively data network 350) with the third party's communications device 160, other communications devices, and/or other communication networks. More specifically, the Emergency Third Party Communications Profile contains files and/or fields that contain: (1) the Emergency Third Party Communications Address, (2) an identifier of a third party's communications device (e.g., a cell phone) associated with the Emergency Third Party Communications Address, (3) an identifier of a third party (e.g., mother, father, neighbor, doctor, etc.), (4) an originating communications address associated with a calling party's communications device (e.g., the phone number and/or IP address of the calling party's communications devie), (5) a parameter for presenting a notification of an incoming emergency conference communication link to the third party's communications device, (6) a parameter for presenting a notification message for alerting the calling party and/or the emergency response call center that the third party is available to join the emergency communications link, (7) a communications parameter (e.g., initiate communications simultaneously with the emergency communications link, initiate communications after the emergency communications link is terminated, and so on), (8) a third party control parameter, and/or (9) an Emergency Response Communications Address (e.g., the phone number and/or IP address of the emergency response call center 130). Still further, the Emergency Third Party Communications Profile may include parameters for (1) archiving the Emergency Third Party Communications Profile to a storage device associated with the telecommunications service provider and/or archiving to alternate storage devices, (2) encrypting the Emergency Third Party Communications Signal (or a portion of the Emergency Third Party Communications Signal) so that only the Emergency Third Party Communications Address and/or third party's communications device 160 can decipher the Emergency Third Party Communications Signal, (3) copying the Emergency Third Party Communications Profile, and (4) associating the Emergency Third Party Communications Profile with a variety of fields, files, and/or other data for Emergency Third Party Communications Services, such as, for example login information associated with the customer, user, and/or administrator, password, telephone number(s) or Service Node(s) of the customer (this may include a plurality of addresses that are associated with a Service Node or other communications switch serving the calling party's communications device), TCP/IP address of the customer, email address of the customer, a time or date identifier (e.g., day of week or calendar date), other information associated with the incoming line identification (ICLID) communications signal, size and content of Emergency Third Party Communications Signal, reply(s), delivery failure notification(s), display and/or presentation data associated with a GUI (e.g., color, font, placement of the Emergency Third Party Communications Module), and/or telecommunications network 330 defaults. Accordingly, the Emergency Third Party Communications DataServer 338, 358 operates with the database 339, 35 of profiles and with the Emergency Third Party Communications Application functions as a computer server, database, and/or processor that is dedicated to managing Emergency Third Party Communications Services including communications of Emergency Third Party Communications Signals over the telecommunications network 330 to other connected networks, communications devices, and/or third party communications device 160. Communications ("Comm") Server 354 of data network 350 operates similar to SCP 334 of telecommunications network 330; Emergency Third Party Communications DataServer 358 and database 359 of data network 350 operate similar to Emergency Third Party Communications DataServer 338 and database 339 of telecommunications network 330.

Figure 5:
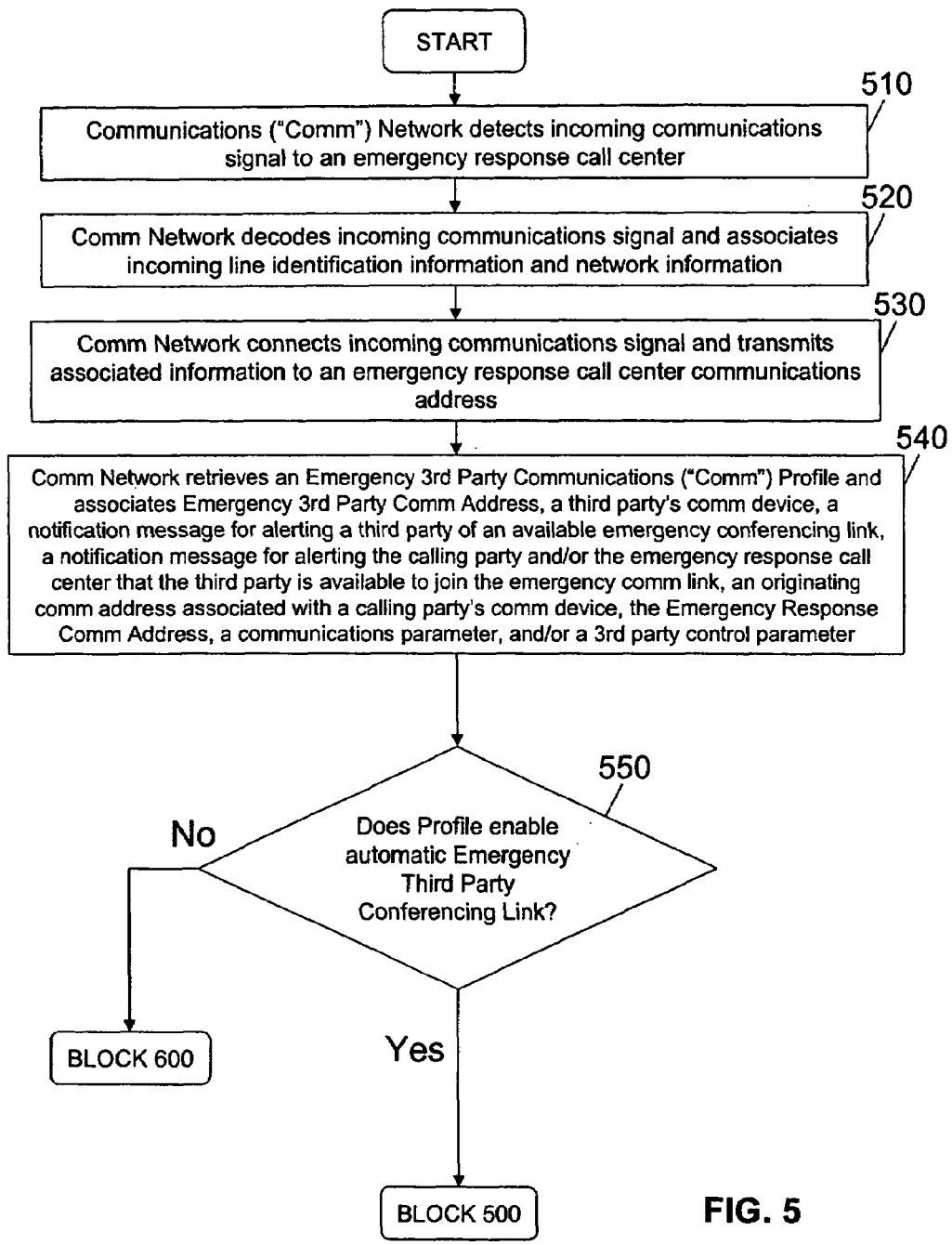
FIGS. 5-7 are flowcharts illustrating communications methods for activating, deactivating, and/or otherwise managing an emergency alert according to embodiments of this invention.
Figure 6:
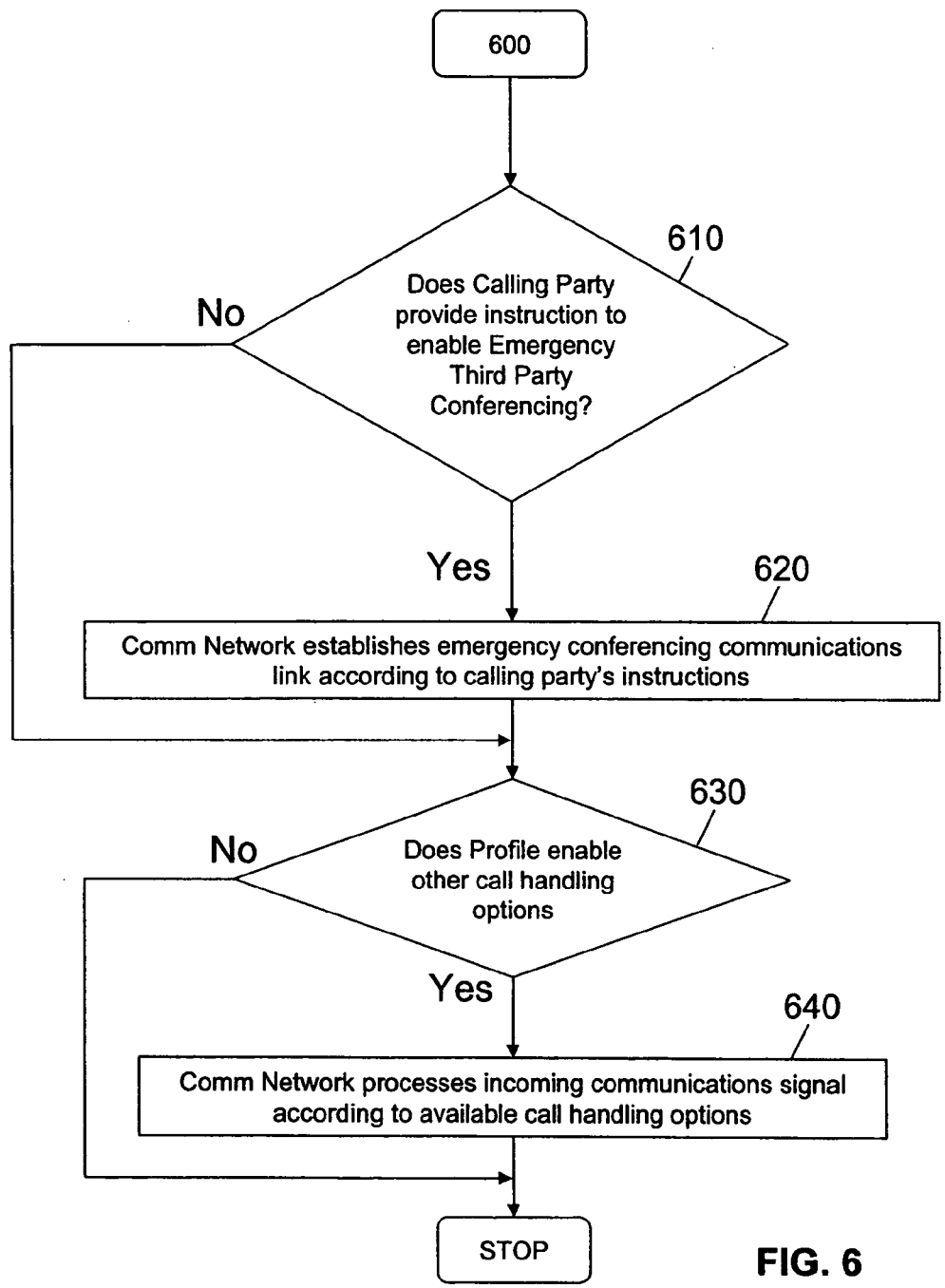
Figure 7:
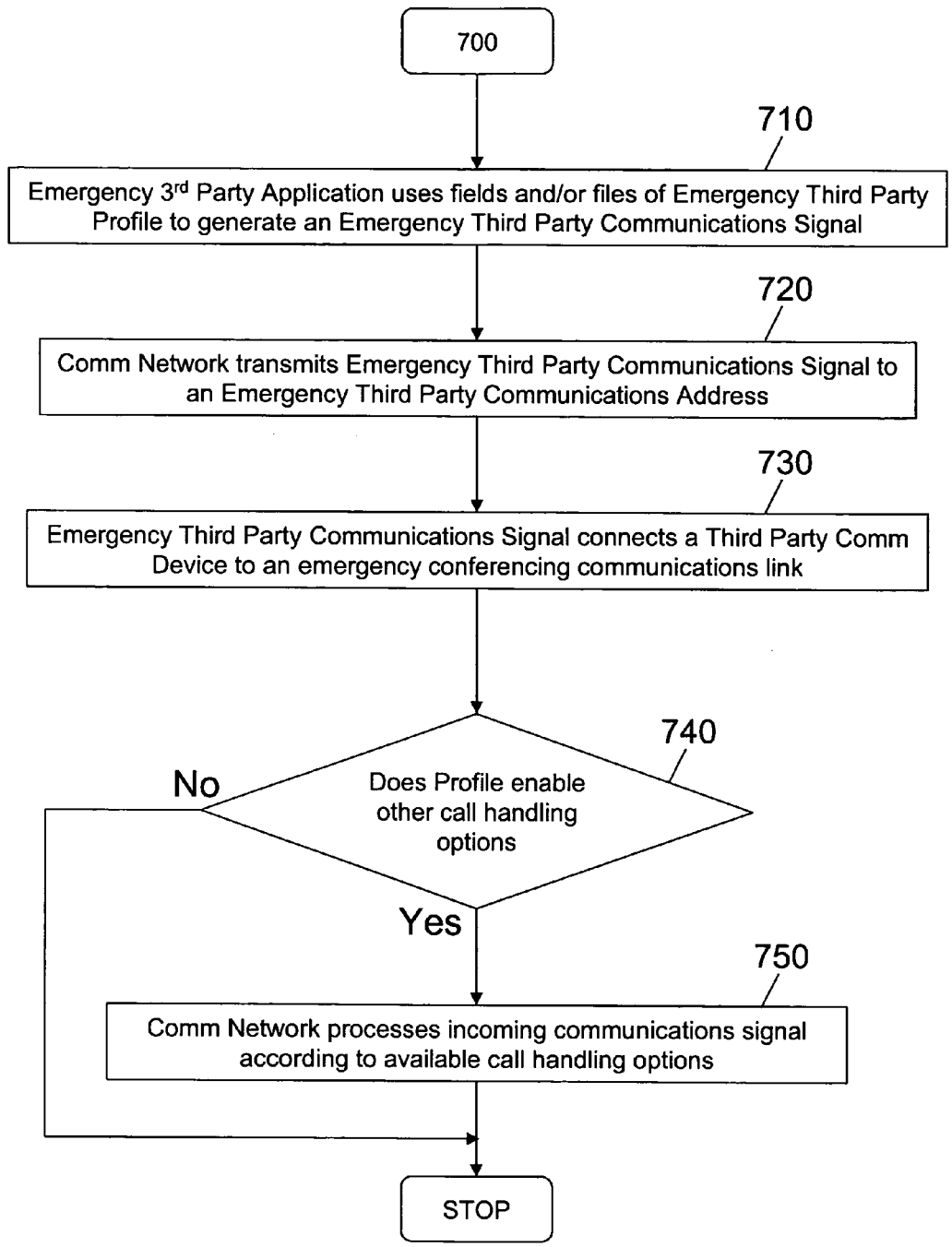

FIGS. 5–7 are flowcharts showing processes of providing the Emergency Third Party Communications Services according to embodiments of this invention. While the processes in FIGS. 5–7 are shown in series, these processes may occur in different orders and/or at simultaneous times as one of ordinary skill in the art will understand.

A user uses a calling party's communications device to place an incoming communication to an emergency response call center and a communications ("Comm") network detects [block 510] and decodes the incoming communications signal and associated incoming line identification information and/or other network-based identification information [block 520]. Thereafter, the communications network connects the incoming communications signal to the emergency response call center and a voice connection or alternate communications link is established with the call center along with the incoming communications signal and associated incoming line identification information [block 530]. At the same time, or near the same time, the communications network matches an Emergency Third Party Communications Profile as described in the above embodiments [block 540] and determines if the profile enable automatic emergency third party conferencing link [block 550]. If no, then the communications network determines if the calling party has authorization to enable control to establish an emergency third party conferencing link [block 610]. If yes, then the communications network establishes the emergency conferencing communications link according to the calling party's instructions [block 620]. Thereafter, the communications network determines if the profile enables other call handling options, such as, sending a notification of activation of the emergency third party conferencing communications link to an alternate communications address [block 630]. If yes, then the communications network processes the incoming communications signal according the other available call handling options provided in the profile [block 640]. If the profile does not enable other call handling options, then the communications method ends. Referring back to "Block 610, " if the calling party is not authorized to enable network-automated emergency third party communications, then the communications network determines if the profile enables other call handling options [block 630]. If yes, then the communications network processes the incoming communications signal according to the other call handling option [block 640]. If the profile does not enable other call handling options, then the communications method ends.

Referring back to "Block 550", if the Emergency Third Party Communications Profile does enable emergency third party conferencing, then the Emergency Third Party Communications Application generates the Emergency Third Party Communications Signal [block 710] and transmits the Emergency Third Party Communications Signal to an Emergency Third Party Communications Address [block 720]. Thereafter, the communications network determines if the profile enables other call handling options [block 730]. If yes, then the communications network processes the incoming communications signal according to the alternate call handling parameters set forth in the profile [block 740]. If the profile does not enable other call handling options, then the communications method ends.

As is apparent to those of ordinary skill in the art, the Emergency Third Party Communications Module 214 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Emergency Third Party Communications Module 314 to be easily disseminated. A computer program product for expanding bandwidth includes the Emergency Third Party Communications Module 314 stored on the computer-readable medium. The Emergency Third Party Communications Module 314 may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While several exemplary implementations of embodiments of this invention are described herein, various modifications and alternate embodiments will occur to those of ordinary skill in the art. For example, the next generation "softswitch" simply replaces the SCP with an "application server." This application server is a conventional computer server that also includes triggers for telecommunications services so that "new entrants" into telecommunications services (e.g., new telecommunications service providers) don't have to purchase an expensive SSP and/or SCP to process telephone calls. This next-generation packet network represents an alternative operating environment for the systems, methods, programs, and apparatuses of this invention. Here the telecommunications switch includes a packet-based "softswitch." This "softswitch" uses software control to provide voice, data, and video services by dynamically changing its connection data rates and protocols types. An application server interfaces with the "softswitch" via a packet protocol, such as Session Initiation Protocol (SIP). This application server includes voice service protocols, triggers, and operations that allow the PSTN and the data network (e.g., the world wide electronic communications network) to interoperate. Accordingly, this invention is intended to include those other variations, modifications, and alternate embodiments that adhere to the spirit and scope of this invention.

What is claimed is:

1. A communications system comprising:
    a communications network for communicating a communications signal to an emergency response communications address via a communications link, the communications network comprising an Emergency Third Party Communications DataServer for storing and processing an Emergency Third Party Communications Profile, the Emergency Third Party Communications Profile comprising (i) an Emergency Third Party Communications Address, (ii) a third party's communications device associated with the Emergency Third Party Communications Address, (iii) an identifier of a third party, (iv) an originating communications address associated with a calling party's communications device, (v) a parameter for presenting a notification of an incoming emergency conference communication to the third party's communications device, (vi) a communications parameter, and (vii) a third party control parameter; and
    an Emergency Third Party Communications Application communicating with the communications network, the Emergency Third Party Communications Application using the Emergency Third Party Communications Profile to initiate communications with an Emergency Third Party Communications Address during the communications link,
    wherein the communications network further enables a communications connection with the Emergency Third Party Communications Address to the communications link.

2. The communications system of claim 1, wherein the Emergency Third Party Communications Application further communicates with a calling party's communications device to initiate communications with the Emergency Third Party Communications Address.

3. The system of claim 2, wherein the calling party's communications device comprises:
a POTS phone,
a wireless communications device,
a mobile phone,
a wireless phone,
a WAP phone,
a satellite phone
a computer,
a modem,
a pager,
a digital music device,
a digital recording device,
a personal digital assistant,
an interactive television,
a digital signal processor, and
a Global Positioning System device.

4. The system of claim 1, wherein the Emergency Third Party Communications Address accesses a third party's communications device.

5. The system of claim 4, wherein the third party's communications device comprises:
a POTS phone,
a wireless communications device,
a mobile phone,
a wireless phone,
a WAP phone,
a satellite phone
a computer,
a modem,
a pager,
a digital music device,
a digital recording device,
a personal digital assistant,
an interactive television,
a digital signal processor, and
a Global Positioning System device.

6. The system of claim 1, wherein the communications network further comprises at least one of a public switched telephone network, a mobile switching telephone communications network, and a satellite communications network.

7. The system of claim 1, wherein the communications network further comprising a world wide electronic data communications network having an Emergency Third Party Conferencing Interface via at least one of an internet, an intranet, and an extranet.

8. A computer program product, comprising:
a computer-readable medium; and
an Emergency Third Party Communications Application stored on the computer-readable medium, the Emergency Third Party Communications Application using at least one of an Emergency Third Party Communications Profile and an instruction from a calling party's communications device to initiate communications with an Emergency Third Party Communications Address during a communications link of the calling party's communications device and an emergency response communications address, the Emergency Third Party Communications Profile comprising (i) an Emergency Third Party Communications Address, (ii) a third party's communications device associated with the Emergency Third Party Communications Address, (iii) an identifier of a third party, (iv) an originating communications address associated with a calling party's communications device, (v) a parameter for presenting a notification of an incoming emergency conference communication to the third party's communications device, (vi) a communications parameter, and (vii) a third party control parameter.

9. A communications method, comprising:
receiving an incoming communications signal from a calling party's communications device to an emergency response communications address;
associating at least one of an incoming line identification (ICLID) signal and an enhanced emergency response identification signal with the incoming communications signal;
associating an Emergency Third Party Communications Profile with the at least one of an incoming line identification (ICLID) signal and an enhanced emergency response identification signal, the Emergency Third Party Communications Profile comprising (i) an Emergency Third Party Communications Address, (ii) a third party's communications device associated with the Emergency Third Party Communications Address, (iii) an identifier of a third party, (iv) an originating communications address associated with a calling party's communications device, (v) a parameter for presenting a notification of an incoming emergency conference communication to the third party's communications device, (vi) a communications parameter, and (vii) a third party control parameter; and
transmitting a third party communications signal to the Emergency Third Party Communications Address, the third party communications signal comprising at least one of a notification of an emergency communications link between the calling party's communications device and the emergency response communications address and of an emergency conferencing link for connecting a third party's communications device with the emergency communications link;
presenting the notification to the third party's communications device; and
using the emergency conferencing link to connect the third party's communications device with the emergency communications link.

10. The method of claim 9, further comprising:
receiving a selection from the third party's communications device to control the emergency conferencing link;
using at least one of the incoming communications signal, the Emergency Third Party Communications Profile, and the selection from the third party's communications device to control the emergency conferencing link.

11. The method of claim 9, further comprising:
presenting a notification to establish the emergency conferencing link to at least one of the calling party's communications device and the emergency response communications address.

12. The method of claim 11, further comprising:
prompting at least one of the calling party's communications device and the emergency response communications address for authorization to establish the emergency conferencing link.

13. The method of claim 11, further comprising:
establishing the emergency conferencing link.

* * * * *